(12) United States Patent
Moga et al.

(10) Patent No.: US 11,092,014 B1
(45) Date of Patent: Aug. 17, 2021

(54) FULL HOOP BLADE TRACK WITH INTERNAL COOLING CHANNEL

(71) Applicant: Rolls-Royce Corporation, Indianapolis, IN (US)

(72) Inventors: Corina Moga, Carmel, IN (US); Tony Lambert, Brownsburg, IN (US); Shaling Starr, McCordsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 16/841,052

(22) Filed: Apr. 6, 2020

(51) Int. Cl.
| | |
|---|---|
| *F02C 7/28* | (2006.01) |
| *F01D 5/14* | (2006.01) |
| *F02C 7/12* | (2006.01) |
| *F01D 9/06* | (2006.01) |
| *F01D 5/08* | (2006.01) |

(52) U.S. Cl.
CPC ............. *F01D 5/143* (2013.01); *F01D 5/084* (2013.01); *F01D 9/065* (2013.01); *F02C 7/125* (2013.01); *F02C 7/28* (2013.01)

(58) Field of Classification Search
None
See application file for complete search history.

(56) References Cited

U.S. PATENT DOCUMENTS

| | | | |
|---|---|---|---|
| 3,936,222 A | 2/1976 | Asplund et al. | |
| 10,415,415 B2 | 9/2019 | Rice et al. | |
| 2007/0020095 A1 | 1/2007 | Dierksmeier et al. | |
| 2016/0208635 A1* | 7/2016 | Vetters | F01D 21/003 |
| 2016/0376901 A1* | 12/2016 | O'Leary | F01D 9/02 |
| | | | 415/116 |
| 2017/0204737 A1* | 7/2017 | Varney | F01D 11/005 |
| 2017/0342849 A1* | 11/2017 | Rice | F01D 11/005 |
| 2018/0023408 A1* | 1/2018 | Rice | F01D 25/24 |
| | | | 415/173.1 |
| 2018/0135460 A1 | 5/2018 | Barker et al. | |
| 2018/0355747 A1* | 12/2018 | Sitler | F02C 7/32 |
| 2018/0371930 A1* | 12/2018 | Sippel | C23C 16/325 |
| 2019/0071996 A1 | 3/2019 | Schmidt | |
| 2019/0301296 A1* | 10/2019 | Freeman | F01D 25/005 |

\* cited by examiner

*Primary Examiner* — Michael Lebentritt
(74) *Attorney, Agent, or Firm* — Crowell & Moring

(57) ABSTRACT

A blade track system includes a blade track configured to be positioned around a plurality of blades of a gas turbine engine. The blade track includes: a full-hoop body, an inlet port, and an exit port. The full-hoop body includes an outer surface and an inner surface. The inner surface defines an internal cooling channel extending within the full-hoop body. The inlet port and the exit port are each integrated with the full-hoop body and in fluid communication with the internal cooling channel.

20 Claims, 7 Drawing Sheets

FULL HOOP BLADE TRACK WITH INTERNAL COOLING CHANNEL

TECHNICAL FIELD

This disclosure relates to gas turbine engines and, in particular, to blade track systems for gas turbine engines.

BACKGROUND

Gas turbine engines for aircraft include an engine, which drives a fan. The fan includes a number of radially extending fan blades mounted on a fan rotor enclosed by a fan casing. A fan track liner may be included within the casing around and adjacent the tips of the fan blades. The fan track liner can include panels which are designed to be cut or rubbed away by the blade tips.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

By way of an introductory example, a blade track system may included a blade track configured to be positioned around a plurality of blades of a gas turbine engine. The blade track may include a full-hoop body including an outer surface and an inner surface. The inner surface may define an internal cooling channel extending within the full-hoop body. The blade track may further include an inlet port and an exit port, each integrated with the full-hoop body and in fluid communication with the internal cooling channel. The inlet port is configured to supply a coolant from external the full-hoop body to within the internal cooling channel. The exit port is configured to discharge the coolant to outside the full-hoop body.

An interesting feature of the systems and methods described below may be that a coolant flow path, including the internal cooling channel, may be isolated from a main flow path and/or a leakage flow path of the gas turbine engine.

Another interesting feature of the systems and methods described below may be that the coolant may be a low pressure coolant that allows for enhanced engine efficiency.

Another interesting feature of the systems and methods described below may be that the coolant may be a modulated coolant supplied to the internal cooling channel.

Still another interesting feature of the systems and methods described below may be that blade tip clearance adjustment may be accomplished with no change in cavity purge or leakage, or potential for hot gas ingestion, such as from the main fluid flow of the engine.

Still another interesting feature of the systems and methods described below is that, after the coolant exits the blade track, it may be captured or used to cool additional downstream features or structures, which may result in increased efficiency.

Figure 1:
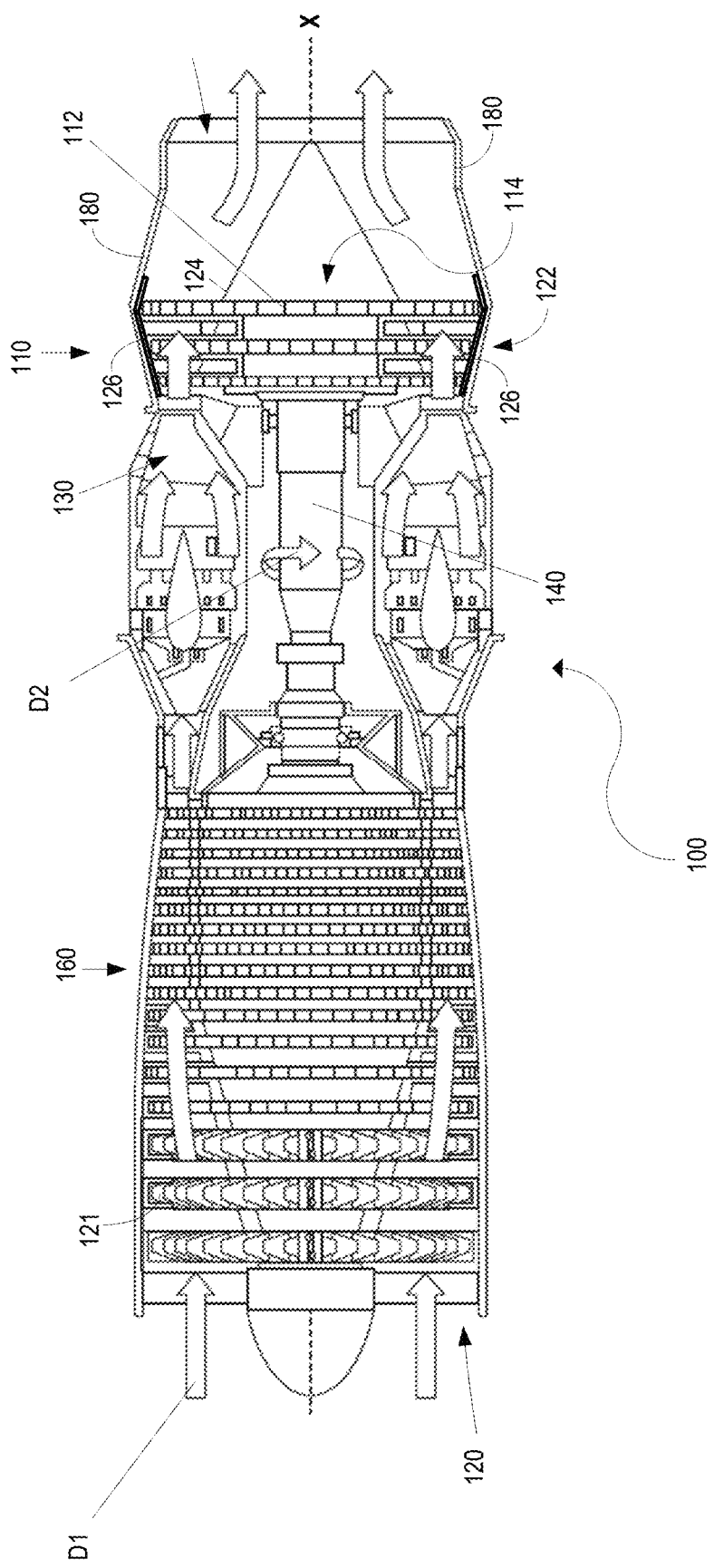
FIG. 1 is a cross-sectional view of a gas turbine engine.

FIG. 1 is a cross-sectional view of a gas turbine engine 100. In some examples, the gas turbine engine 100 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 100 may take a variety of forms in various embodiments. Though depicted as an axial flow engine, in some forms the gas turbine engine 100 may have multiple spools and/or may be a centrifugal or mixed centrifugal/axial flow engine. In some forms, the gas turbine engine 100 may be a turboprop, a turbofan, or a turboshaft engine. Furthermore, the gas turbine engine 100 may be an adaptive cycle and/or variable cycle engine. Other variations are also contemplated.

The gas turbine engine 100 may include an intake section 120, a compressor section 160, a combustion section 130, a turbine section 110, and an exhaust section 150. During operation of the gas turbine engine 100, a main fluid received from the intake section 120, such as air, travels through a main fluid flow path in a main fluid flow path direction D1 through blades 121 in the intake section 120. As shown in FIG. 1, the main fluid flow path direction D1 is generally parallel with a centerline X of the engine 100. The fluid may be compressed within the compressor section 160. The compressed fluid may then be mixed with fuel and the mixture may be burned in the combustion section 130. The combustion section 130 may include any suitable fuel injection and combustion mechanisms. The hot, high pressure fluid may then pass through the turbine section 110 to extract energy from the fluid and cause a turbine shaft of a turbine 114 in the turbine section 110 to rotate, which in turn drives the compressor section 160. Discharge fluid may exit the exhaust section 150.

As noted previously, the hot, high pressure fluid passes through the turbine section 110 during operation of the gas turbine engine 100. As the fluid flows through the turbine section 110, the fluid passes between adjacent turbine blades 112 of the turbine 114 causing the turbine 114 to rotate. The rotating turbine 114 may turn a shaft 140 in a rotational direction D2, for example. The turbine blades 112 may rotate around an axis of rotation, which may correspond to a centerline X of the turbine 114 in some examples.

The turbine blades 112 may be distributed in an array of blades 122 circumferentially spaced around a hub 124 (or core or turbine spool) of the turbine 114. Circumferentially surrounding the array of blades 122 is a blade track system 126. The blade track system 126 is designed to track outer edges or tips of turbine blades 112 included in the array of blades 122 as the blades 112 radially expand and contract, due to, for example, rotation of the hub 124 causing centrifugal force, and/or changes in temperature causing materials to expand and contract. Thus, as the diameter formed by the tips of the array of blades 122 expands and contracts, a blade track included in the blade track system 126 similarly expands and contracts to minimize rub of the tips of the blades 128 on the blade track under acceleration and deceleration operational conditions of the gas turbine.

During steady state operation of the gas turbine engine, the blade track may minimize clearance between the blade track and the tips of the turbine blades 122 to maximize efficiency. In some embodiments, the blade track system 126 is a dual response blade track system in that it responds with different rates of expansion and contraction to increases and decreases in temperature corresponding to acceleration and deceleration of the gas turbine engine. In other embodiments, the blade track system 126 is a single response blade track system in that it responds (expands and contracts) at the same rate when subject to changes in temperature due to acceleration and deceleration of the gas turbine engine.

Surrounding the blade track system 126 is a turbine casing 180. The blade track system 126 is positionable axially with the centerline X within the turbine casing 180 and radially outward of the turbine blades 112. The blade tracks may be dynamically radially moved outwardly and inwardly by the blade track system 126 in response to dynamic operation of the gas turbine engine 100 to avoid/control a rub of the tip of the turbine blades 112 on the segments of the blade tracks.

As described in further detail below, the engine 100 includes a blade track cooling system, or just cooling system, that is configured to control or regulate a temperature of the blade track system 126 by supplying a coolant directly to a blade track of the blade track system 126. The blade track includes an internal cooling channel that is part of, or in fluid communication with, the cooling system, and that receives the coolant and delivers the coolant internally within the blade track in order to control the temperature of the blade track and/or the blade track system 126. The blade track may have a full-hoop body through which the internal cooling channel extends.

A coolant flow path, including the internal cooling channel, may be separated and/or isolated from other flow paths near and/or extending through the blade track system 126, including the main fluid flow path and/or one or more leakage paths. By being isolated from these other paths, the coolant flow path may supply a low pressure coolant, such as a low pressure air supply, and the cooling system may control the flow of the coolant, such as by controlling the amount or rate of the coolant, flowing to the blade track and/or to within its internal cooling channel. Doing so may allow the cooling system to reduce or completely shut off the flow of the coolant to the blade track, without concern of ingestion of the hot, high pressure fluid in the main fluid flow path into the blade track or case region surrounding the blade track.

Through control of the coolant flow, the cooling system may control and/or adjust radial deflection of the blade track, which in turn controls and/or adjusts an amount of tip clearance between the blade tips and the blade track. For example, during certain transient conditions, the cooling system may control the coolant flow to the blade track in order to increase, or otherwise set, the tip clearance in order to avoid rubbing between the inner surface of the blade track and the blade tips. Additionally, during steady state conditions, the cooling system may control, or otherwise set, the coolant flow to the blade track in order to tighten or minimize the tip clearance, which in turn may allow for increased performance. Further details of an example configuration of the blade track system 126 configured to couple to, forming a coolant flow path with, or forming part of, a cooling system, is now described.

Figure 2:
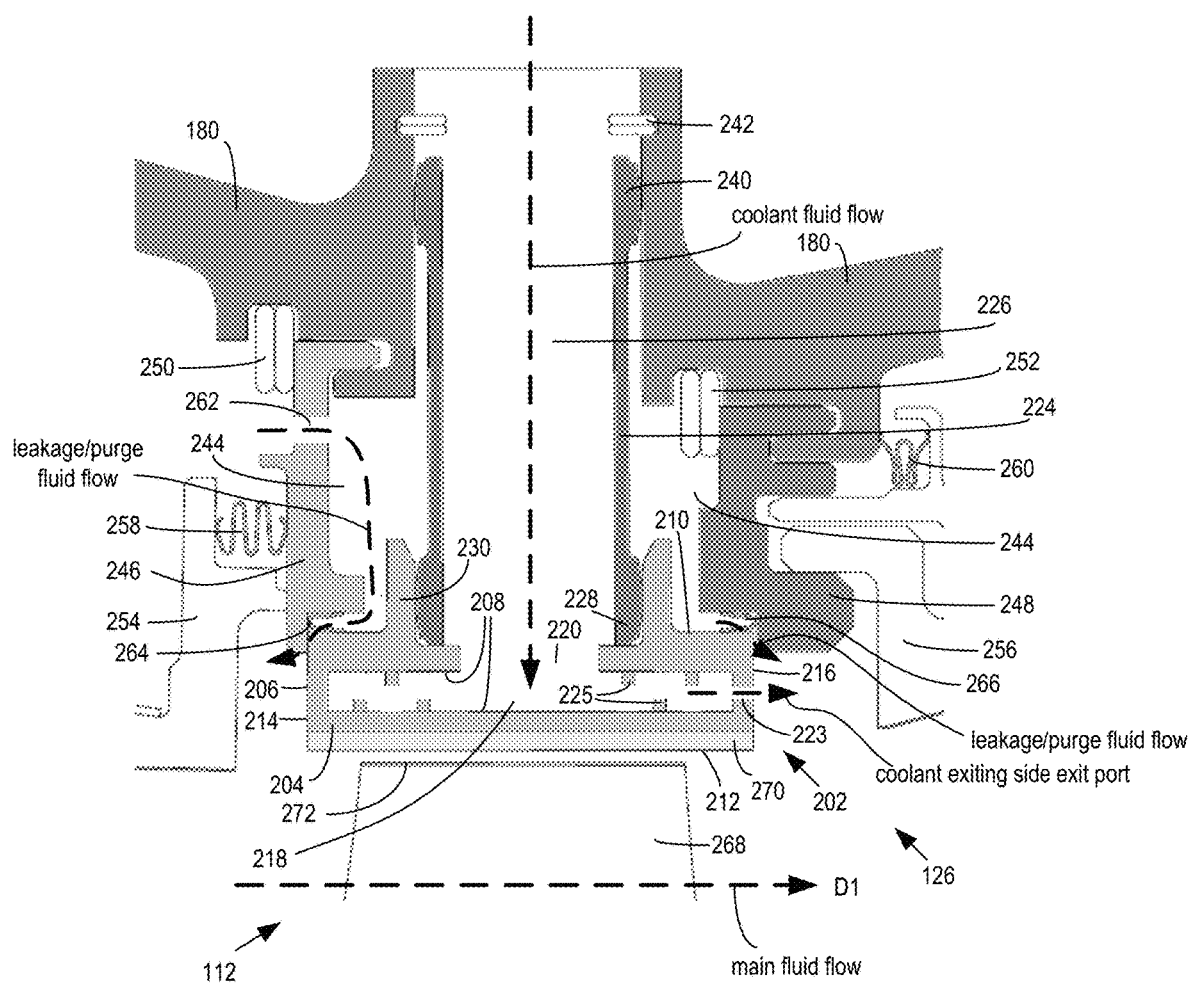
FIG. 2 is an enlarged cross-section of a portion of a gas turbine engine, that illustrates an example of the blade track system.
Figure 3:
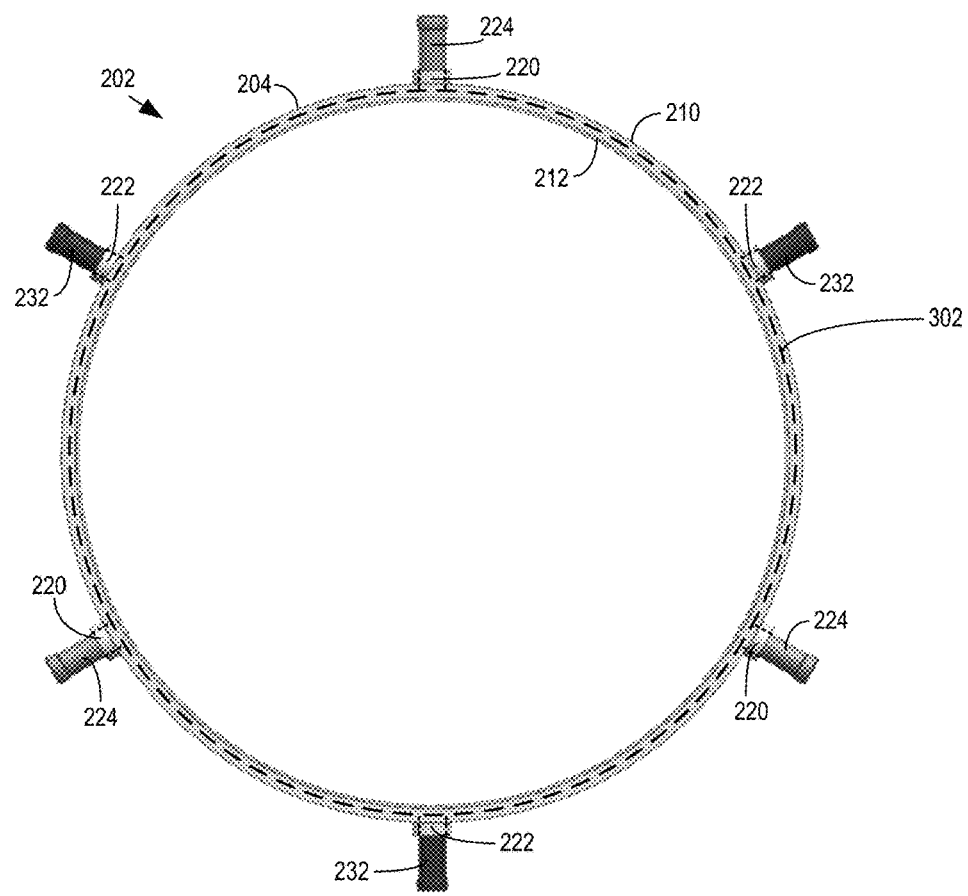
FIG. 3 is a perspective side view of a full-hoop blade track coupled to inlet and exit tubes.

FIG. 2 is an enlarged cross-section of a portion of the gas turbine engine 100 that illustrates an example of the blade track system 126. The blade track system 126 includes a blade track 202 having a blade track body 204. The blade track body 204 is a full-hoop blade track body. In general, a full-hoop body is a unitary, continuous ring-like structure, rather than a plurality or series of discontinuous segments oriented in a hoop or ring shape. FIG. 3 shows a perspective side view of the full-hoop structure of the blade track body 204 in its entirety. For at least some example embodiments, the blade track body 204 is made of a metallic material, although other types of materials may be possible.

The blade track body 204 includes an outer surface 206 and an inner surface 208. The outer surface 206 includes a plurality of surface portions, including a radially outward surface portion 210, a radially inward surface portion 212, and side surface portions, including a forward side surface portion 214 and an aft side surface portion 216. The radially outward surface portion 210 is a radially outer-most portion of the outer surface 206 and faces in a radially outward direction from the turbine blades 112. The radially inward surface portion 212 is a radially inner-most portion of the outer surface 206 and faces in a radially inward direction toward the turbine blades 112. The forward side surface portion 214 is a forward-most portion of the outer surface 206 disposed between the radially outward and radially inward surface portions 210, 212, and faces in a direction opposite to the main fluid flow path direction D1. The aft side surface portion 216 is an aft-most portion of the outer surface 206 disposed between the radially outward and radially inward surface portions 210, 212, and faces in the same direction as the main fluid flow path direction D1.

In addition, the inner surface 208 defines an internal cooling channel 218 internally extending within the blade track body 204. As described in further detail below, the internal cooling channel 218 is in fluid communication with, or is part of, a cooling system that supplies a coolant directly to the blade track 202, i.e., by supplying the coolant to the internal cooling channel 218.

Figure 4:
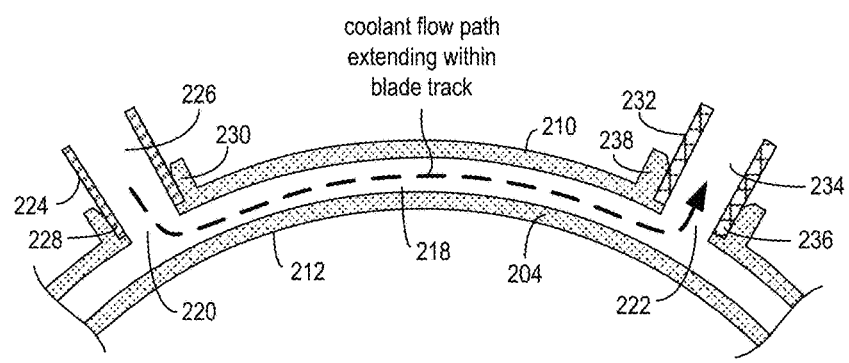
FIG. 4 is an enlarged cross-section of a portion of the full-hoop blade track coupled to an inlet tube and an exit tube of FIG. 3.
Figure 5:
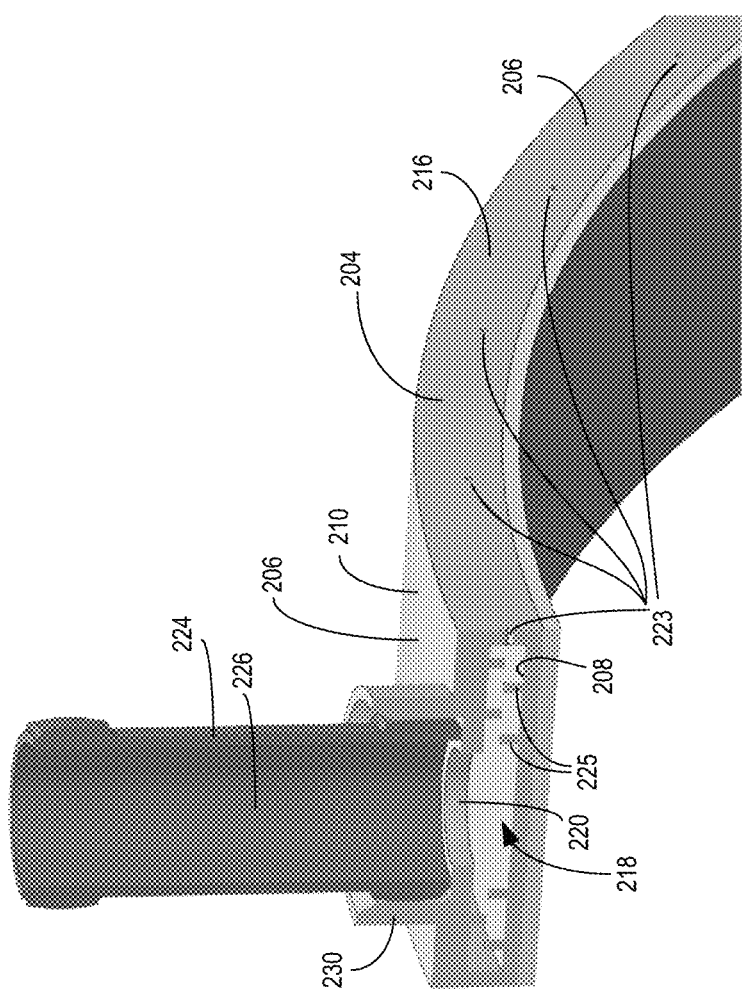
FIG. 5 is an enlarged perspective and cross-section view of a portion of a full-hoop blade track coupled to an inlet tube, showing an internal cooling channel and side exit ports.

Referring also to FIGS. 3-5, the blade track 202 further includes at least one inlet port 220 and at least one exit port, including at least one radial exit port 222 and/or at least one side exit port 223. The inlet port(s) 220 and the exit port(s) 222/223 are integrated with the full-hoop body, and each generally extend within the blade track body 204 between the inner surface 208 and the outer surface 206. The cooling system may supply the coolant from external the blade track body 204 to within the blade track body 204 (i.e., to the internal cooling channel 218) via the inlet port(s) 220. Additionally, the coolant may exit the internal cooling channel 218 (move from within the blade track body 204 to external (outside of) the blade track body 204) via the exit port(s) 222/223. Accordingly, as shown in FIG. 4, at least a portion of a coolant flow path for coolant that cools the blade track 202 may be defined by the blade track 202 itself, and extend from an inlet port 220, over a least a portion of the internal cooling channel 218, to an exit port 222.

The internal cooling channel 218 extends through at least a portion of the full-hoop body 204. For example, at a minimum, the internal cooling channel 218 extends within the full-hoop body 204 from an inlet port 220 to an exit port 222/223. In particular embodiments, the internal cooling channel 218 circumferentially extends through the entire full-hoop body 204, as shown by the dashed circle 302 in FIG. 3. For such particular embodiments, the full-hoop track 202 is a hollow structure with an internal cavity or channel that extends entirely through the full hoop structure.

Additionally, for at least some example embodiment, such as shown in FIGS. 2 and 5, the inner surface 208 may include one or more thickening portions 225, such as ribs, fins, pin-fins, or projections, circumferentially extending within the internal cooling channel 218 that create areas of increased thickness of the blade track body 204 between the outer surface 206 and the inner surface 208, relative to a thickness of areas of the blade track body 204 directly adjacent to the thickening portion(s) 225. The thickening portion(s) 225 may increase a surface area of the inner surface 208 in order to enhance cooling of the blade track body 204.

For at least some example configurations, as shown in FIGS. 2-5, the inlet port(s) 220 may radially extend in the body 204 between the inner surface 208 and the radially outward surface portion 210 of the outer surface 208. Additionally, the exit port(s) 222/223 may extend in the body 204 in various ways. For some example configurations, as shown in FIGS. 3 and 4, radial exit port(s) 222 are configured like the inlet port(s) 220 in that they radially extend between the inner surface 208 and the radially outward surface portion 210. For other example configurations, as shown in FIGS. 2 and 5, the side exit port(s) 223 axially extend from the inner surface 208 to a side surface portion of the outer surface 206. In the example configuration in FIGS. 2 and 5, each of the side exit port(s) 223 axially extend to the aft side surface portion 216, although other configurations where the exit ports 223 extend to the forward side surface portion 214, or a combination where at least one exit port 223 extends to the forward side surface portion 214 and at least one exit port 223 extends to the aft side surface portion 216, may be possible. Still other example configurations may include a combination of the radial and side exit ports 222 and 223, such that the blade track 202 includes at least one radial exit port 222 that radially extends to the radially outward surface portion 210 and at least one side exit port 223 that axially extends to a side surface portion, such as the aft side surface portion 216.

Additionally, as mentioned, the blade track 202 includes at least one inlet port 220 and at least one exit port 222/223. FIG. 3 shows an example embodiment of the blade track 202 including three inlet ports 220 and three exit ports 222. In various other embodiments, the blade track 202 may include less than or more than three inlet ports 220 and/or less than or more than three exit ports 222/223. Also, for some example embodiments of the blade track 202, such as the one shown in FIG. 3, the number of inlet ports 220 is the same as the number of exit ports 222 (e.g., three in FIG. 3). In other embodiments, the number of inlet ports 220 is different than the number of exit ports 222/223. For such embodiments, the number of inlet ports 222 may be greater than the number of exit ports 222/223, or may be less than the number of exit ports 222/223. Any of various numbers for the inlet and exit ports 220/222/223 may be possible.

Also, for some embodiments, the inlet and exit ports 220, 222, 223 may be positioned relative to each other circumferentially about the body 204 in any of various ways. For at least some embodiments, the input ports 220 may be circumferentially spaced or positioned equidistant from each other about the body 204 and/or over the radially outward surface portion 210, exit ports 222/223 may be circumferentially spaced or positioned equidistant from each other about the body 204 and/or over the radially outward surface portion 210, or some combination thereof, as illustrated in FIGS. 3 and 5. In addition or alternatively, for at least some configurations that include radial exit port(s) 222, the inlet and exit ports 220, 222 may be alternatingly positioned about the body, such that each inlet port 220 is circumferentially positioned between two radial exit ports 220, each radial exit port 222 is circumferentially positioned between two inlet ports 220, or a combination thereof. For other example configurations, at least two inlet ports 220 may be circumferentially adjacent to each other, and/or at least two radial exit ports 222 may be circumferentially adjacent to each other, where two input ports 220 are adjacent to each other if no radial exit ports 222 are circumferentially disposed between them, and where two radial exit ports 222 are adjacent to each other if no inlet ports 220 are circumferentially disposed between them. Various ways of positioning the inlet and exit ports 220/222/223 circumferentially about the body 204 relative to each other are possible.

In addition, for at least some embodiments, such as those shown in FIGS. 2-5, the blade track system 126 may include one or more inlet tubes 224 coupled to the blade track 202. Each inlet tube 224 may have an inner lumen 226 extending through, and is configured to supply coolant through its inner lumen 226 to a respective inlet port 220. In various embodiments, each inlet tube 224 may be considered part of the cooling system, in addition or alternatively to being part of the blade track system 126.

To be configured to supply coolant to a respective inlet port 220, each inlet tube 224 is positioned relative to the blade track body 204 such that its inner lumen 226 is aligned and in fluid communication with the respective inlet port 220. In turn, the inlet tube 224 supplies coolant that it receives to the respective inlet port 220. For at least some of these embodiments, the inlet tube 224 includes a first end 228 radially closest to the blade track body 204 that contacts, or otherwise couples to, the radially outward surface portion 210, such that coolant directly enters the respective inlet port 220 upon leaving the inner lumen 226 of the inlet tube 224. Ways of coupling the inlet tube 224 to the blade track body 204, other than through direct contact between the inlet tube first end 228 and the radially outward surface portion 210 may be possible.

Also, for at least some example embodiments, such as those shown in FIGS. 2-5, the blade track body 204 includes one or more inlet bosses 230 disposed on, and radially projecting from, the radially outward surface portion 210. Each inlet boss 230 is associated with a respective inlet port 220 and surrounds a radially outward most opening of the respective inlet port 220. The inlet boss 230 serves as a guide into which the inlet tube first end 228 may be inserted into, and/or within which the inlet tube first end 228 may be disposed and/or secured, in order to align the inlet tube lumen 226 with the respective inlet port 220.

In addition, for at least some example embodiments that include one or more radial exit ports 222, such as those shown in FIGS. 3 and 4, the blade track system 126, and/or the cooling system, may include one or more exit tubes 232 coupled to the blade track 202. Each exit tube 232 is configured to receive coolant and move the coolant through its inner lumen 234 to a secondary location or structure external the blade track. Details regarding the secondary external location/structure is described in further detail below. The exit tube(s) 232 may be configured similarly as the inlet tube(s). That is, each exit tube 232 is positioned relative to the blade track body 204 such that its inner lumen 234 is aligned and in fluid communication with the respective exit port 222. In turn, the exit tube 224 supplies coolant that it receives from a respective exit port 222 to an external location. For at least some of these embodiments, the exit tube 232 includes a first end 236 radially closest to the blade track body 204 that contacts, or otherwise couples to, the radially outward surface portion 210, such that coolant directly enters exit port inner lumen 234 upon leaving the respective exit port 222. Like the inlet tube 224, ways of coupling the exit tube 232 to the blade track body 204, other than through direct contact between the exit tube first end 236 and the radially outward surface portion 210 may be possible.

Also, for at least some example embodiments including one or more exit tube 232, such as those shown in FIGS. 3 and 4, the blade track body 204 includes one or more exit bosses 238 disposed on, and radially projecting from, the radially outward surface portion 210. Similar to the inlet boss(es) 230, each exit boss 238 is associated with a respective exit port 222 and surrounds a radially outward most opening of the respective exit port 222. The exit boss 238 serves as a guide into which the exit tube first end 236 may be inserted into, and/or within which the inlet tube first end 236 may be disposed and/or secured, in order to align the exit tube lumen 234 with the respective exit port 222.

Referring particularly to FIG. 2, for at least some example embodiments, each inlet tube 224 may radially outwardly extend into the turbine casing 180. For example, the inlet tube 224 may include a second end 240 radially furthest from the blade track 202 that is disposed within and/or coupled to the casing 180. In various embodiments, a retaining ring 242 may be integrated with the casing 180 and positioned radially outwardly beyond the inlet tube second end 240 in order to maintain a coupling between the inlet tube 224 and the blade track 202, or keep the inlet tube's 224 position relative to the blade track 202 and the casing 180. The cooling system may include one or more components, such as conduits, hoses, pipes or the like, that attaches to the casing 180, or directly to the inlet tube 224, in order to deliver coolant to the inlet tube inner lumen 226. In various embodiments, the casing 180 may be considered part of the cooling system.

Although not shown in the figures, for embodiments that include one or more exit tubes 232, such embodiments may configure the exit tube(s) 232 in the same or similar way as the inlet tube(s) 224, in that they may radially outwardly extend to, and be disposed within the casing 180. For such embodiments, the coolant, after exiting the internal cooling channel 218, may travel through the casing 180 to another location.

Additionally, as shown in FIG. 2, in various embodiments, the blade track 202 may be radially spaced apart from each other by a certain distance to define radially inner and outer bounds of a circumferential cavity 244 disposed between the blade track 202 and the casing 180. As shown in FIG. 2, the inlet tube(s) 224 may radially extend from the first end 228 to the second end 240 through the circumferential cavity 244. Additionally, the blade track system 126 may include a ring-shaped seal plates, including a forward seal plate 246 and an aft seal plate 248. As shown in FIG. 2, each of the forward and aft seal plates 246, 248 may be circumferentially disposed between, and engage with, each of the blade track 202 and the casing 180. The forward and aft seal plates 246, 248 may restrain axial movement of the blade track 202, and also seal the circumferential cavity 244 through their engagement with the casing 180 and blade track 202. As shown in FIG. 2, the forward seal plate 246 may provide a forward boundary of the circumferential cavity 244, and the aft seal plate 248 may provide an aft boundary of the circumferential cavity. Also, in various embodiments, additional retaining rings 250, 252 may engage with the seal plates 246, 248 to retain them in their respective relative positions.

Additionally, for various embodiments such as shown in FIG. 2, surfaces of the forward and aft seal plates 246, 248 opposite those surfaces defining the circumferential cavity 244 may engage with forward and aft vanes 254, 256 respectively positioned forward and aft the forward and aft seal plates 246, 248. Seals 258, 260, such as W seals or E seals, may be positioned between a seal plate and a vane, or between a vane and the casing 180, to prevent air or fluid flow between such components.

Figure 6:
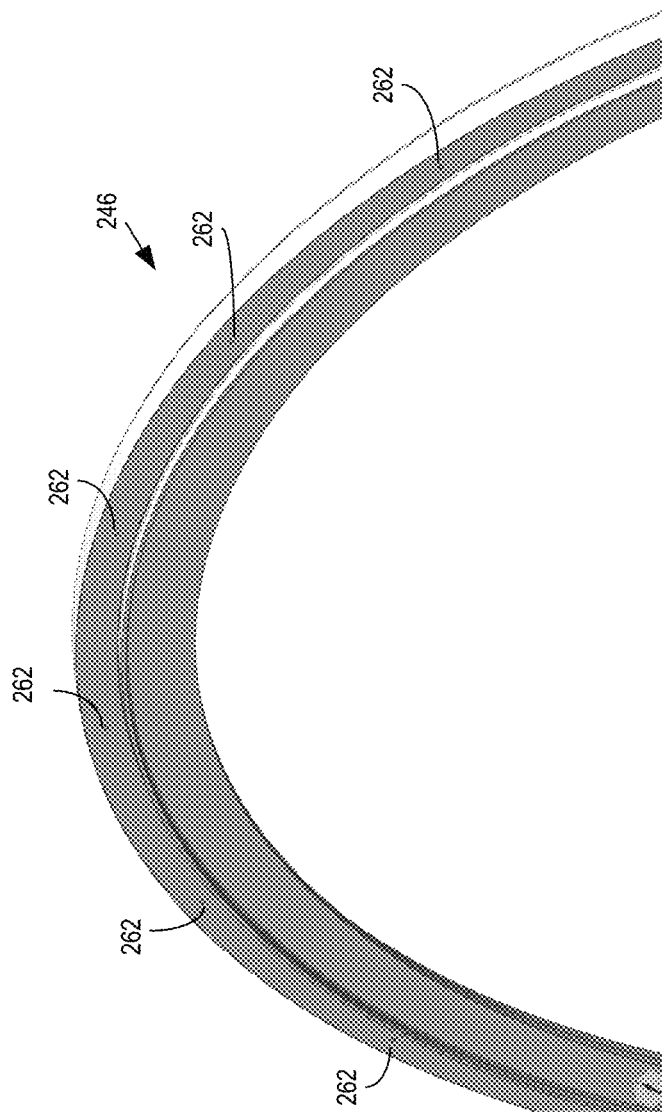
FIG. 6 is an enlarged perspective view of a forward seal plate with a plurality of side ports.

FIG. 6 shows a perspective axial view of a portion of the forward plate 246. Referring to both FIGS. 2 and 6, for at least some embodiments, the forward plate 246 may include at least one seal plate port 262 axially extending through the forward plate 246. FIG. 6 shows an embodiment of the forward plate 246 that includes a plurality seal plate ports 262 circumferentially positioned around the forward plate 246. The seal plate port(s) 262 permit a flow of fluid (e.g., air) to move from external to within the circumferential cavity 244. The fluid flowing through the seal plate port 262 may be compressor discharge air from the compressor section 160, for at least some embodiments. In addition or alternatively, the fluid is a leakage or a purge fluid (purge being a term used to refer to a desired leakage). Hereafter, the fluid passing through the seal plate port(s) 262 is referred to as a leakage fluid or purge fluid.

As shown in FIG. 2, the blade track system 126 includes seals, such as in the form of omega seals, 264, 266 disposed between the blade track 202 and the forward and aft seal plates 246, 248, respectively. The seals 264, 266 may permit leakage fluid to flow from within the circumferential cavity 244 to external the circumferential cavity 244 to a region extending radially inward where the turbine blades 112 surrounded by the blade track 202 are disposed, and where a main fluid flow that flows through the turbine blades 112 occurs. In this context, the forward and aft seal plates 246, 248, in combination with various combinations of the casing 180, the inlet tube(s) 224, the exit tube(s) 232, and the blade track 202, and the seals 264, 266, may define a leakage fluid flow path extending from the seal plate port 262, through the circumferential cavity 244, through the seals 264, 266, into a radially inward region where the main fluid flow flows through the blades 112. The leakage fluid flow path creates a higher pressure in the circumferential cavity than the radially inward region to desirably prevent the main fluid flow from leaking, or otherwise flowing, radially outward into the circumferential cavity 244 between the blade track 202 and the casing 180.

Also, as mentioned, the blade track 202 may circumferentially surround at least some of the plurality of blades 112, including a blade 268. A main fluid flow may flow over a main fluid flow path in a main fluid flow direction through the blades 112, as shown in FIG. 2. The radially inward surface portion 212 may be a portion of the track 202 closest to the blade 262. In various embodiments, a coating 270, such as an abradable coating, may cover or otherwise form the radially inward surface 212. Also, a blade tip 272 of the blade 268 may be a portion of the blade 268 closest to the track 202. Blade tip clearance may be defined by a distance between the radially inward surface portion 212 and the blade tip 272. The blade tip clearance may be a variable amount that the cooling system can set, control, and/or adjust by setting, controlling, and/or adjusting the flow of coolant into the internal cooling channel 218 of the blade track 202.

The coolant flow path may be independent, isolated, or separate from the main fluid flow path and/or the leakage flow path, in that fluid from one or both of these paths cannot enter into the coolant flow path, including entering into the internal cooling channel 218 within the blade track body 204. This, in turn, will allow the cooling system to more accurately control the flow of coolant to the blade track 202 to achieve a desired blade tip clearance, and/or to more efficiently provide coolant to the blade track 202. For example, if the cooling system determines to provide coolant to the blade track 202 at a reduced amount or rate, or to completely shut off the coolant to the blade track 202, in order to achieve a desired blade tip clearance, the cooling system can do so without concern that fluid from the leakage flow path and/or from the main fluid flow path will enter into the coolant flow path and undesirably affect the tip clearance.

Figure 7:
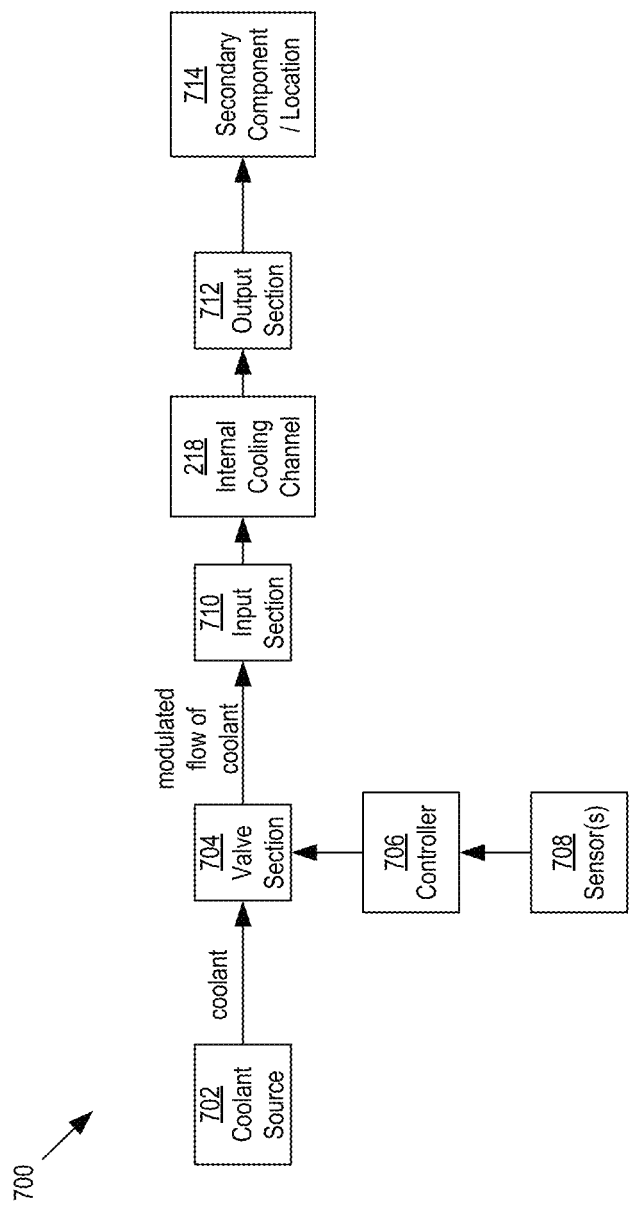
FIG. 7 is a block diagram of an example cooling system configured to supply coolant to an internal cooling channel of a blade track.

FIG. 7 shows a block diagram of an example cooling system 700 used to supply a coolant to the blade track 202, which may incorporate at least some of the components described with reference to FIGS. 1-6. The cooling system 700 may include a coolant source 702 that generates a coolant supplied to the blade track 202 or is otherwise a component where the coolant originates. For at least some example embodiments, the coolant source is the compressor section 160 of the engine 100. In various embodiments, the coolant may be air that leaks from a compressor case of the compressor section 160. In addition or alternatively, for at least some of these embodiments, the coolant source is a low stage of the compressor section 160. In general, a compressor section 160 may include a plurality of stages. The lower the stage, the closer the stage is to the intake section 120, and/or the lower the pressure of the air that the stage discharges. In various embodiments, a low stage of the compressor section 160 is a stage in a lower half of the plurality of stages. In particular embodiments, a low stage is a first stage or a second stage of the compressor section.

The coolant source 702 may supply the coolant to a valve section 704 that includes one or more valves. For example, the coolant source 702 may supply the coolant as an input coolant for the valve section 704. The valve section 704 is a controllable device (or plurality of controllable) devices) that can control, set, and/or adjust an amount of flow, or a flow rate, of fluid (e.g., air) that the valve receives. For example, the valve section 704 may receive the input coolant at a certain input rate, and output coolant at a certain output rate that is the same as or different than the input rate. The valve section 704 is configured to temporarily change or adjust the output flow rate such that the valve section can output fluid at different output flow rates at different times or over different time periods. By being able to have its flow rate changed or adjusted, the coolant that the valve section 704 outputs is referred to as a modulated coolant or a modulated flow of coolant. Similarly, by being able to change the flow rate of the fluid, the valve section 704 is referred to as being configured to modulate the flow of the coolant supplied from the coolant source 702 to the blade track 202.

As shown in FIG. 7, the cooling system 700 may include, or be coupled to, a controller 706 configured to control the valve section 704. For example, the controller 706 may be configured to output one or more control signals, through wired and/or wireless connections, to the valve section 704 that configures the valve section 704 in a state corresponding to a desired output flow rate, and/or that can change the state of the valve section 704 in order to change the output flow rate from one value to another. The controller 706 is an electronic device configured in hardware, or a combination of hardware and software, such as in the form of one or more processors configured to access and execute computer instructions (software and/or firmware) stored in memory (volatile and/or non-volatile), digital logic circuitry, or a combination thereof, that enables the controller 706 to carry out its functions. In various embodiments, the controller 706 is part of the engine 100, or a component external or separate from the engine 100.

In addition, the controller 706 may be electronically coupled to at least one sensor 708. The at least one sensor 708 may be configured to sense and quantify any of a variety of measurable parameters within the engine 100 that the controller 706 may use to determine a desired coolant flow rate for the valve section 704, or otherwise a desired configuration for the valve section 704, non-limiting examples of which include temperature, pressure, speed, vibration, and acceleration. In particular embodiments, the at least one sensor 708 includes a temperature sensor that senses temperature of the main fluid flowing in the main fluid flow path, fluid velocity or flow meter that senses the speed of the fluid flowing in the main fluid flow path, or a combination thereof. Various sensor configurations are possible.

The valve section 704 may be configured to output the modulated coolant to an input section 710. The input section 710 may be configured to receive the modulated coolant from the valve section 704, and supply the modulated coolant to the internal cooling channel 218 of the blade track 202. Any of various structures, or combinations of structures, disposed between the valve section 704 and the inner surface 208 of the blade track body 204 defining the internal cooling channel 218, may form at least a part of the input section 710, such as the casing 180, the inlet tube(s) 224, and at least a portion of the blade track body 204 defining the inlet port(s) 220, as previously described with reference to FIGS. 1-6.

The input section 710 may be configured to output or supply the modulated coolant to the internal cooling channel 218 (or to the inner surface 208 defining the internal cooling channel 218). The internal cooling channel 218 may supply the modulated coolant from the input section 710 to an output section 712. In being moved through the internal cooling channel 218 within the blade track body 204, the modulated coolant may cool, or otherwise regulate the temperature of, the blade track body 204 from within.

The output section 712 may be configured to receive the modulated coolant from the internal cooling channel 218. Any of various structures, or combinations of structures, in fluid communication with and configured to receive the modulated coolant after it flow through at least a portion of the internal cooling channel 218, may form at least a portion of the output section 712, such as the radial and/or side exit ports 222, 223, the exit tube(s) 232, and/or the casing 180.

The output section 712 may be configured to supply the modulated coolant to a secondary location or component. Herein, the terms secondary component and secondary location are used to refer to a component or location other than a blade track receiving coolant from the cooling system. In some embodiments, the secondary location/component 714 may generally be a region or cavity within or external to the engine 100 where the modulated coolant, after cooling the blade track 202 and passing through the output section 712 is discharged or dispersed. In various embodiments where the blade track 202 includes side exit ports 223, modulated coolant flowing through the side exit ports 223 may flow into the region where the turbine blades 112 are disposed and combine with the main fluid flow.

In addition or alternatively, the secondary location/component is a physical structure configured to receive, be cooled by, and/or have its temperature regulated by, the modulated coolant after passing through the internal cooling chamber 218, such as a vane or a component of a vane (e.g., an air foil) positioned aft or downstream from the blade track 202. In addition or alternatively, the modulated coolant may become part of a leakage or purge fluid in a leakage or purge fluid flow path. In general, for various embodiments, the modulated coolant, after internally passing through the blade track 202, may be used for some other purpose (such as cooling another engine component or as leakage/purge fluid).

Figure 8:
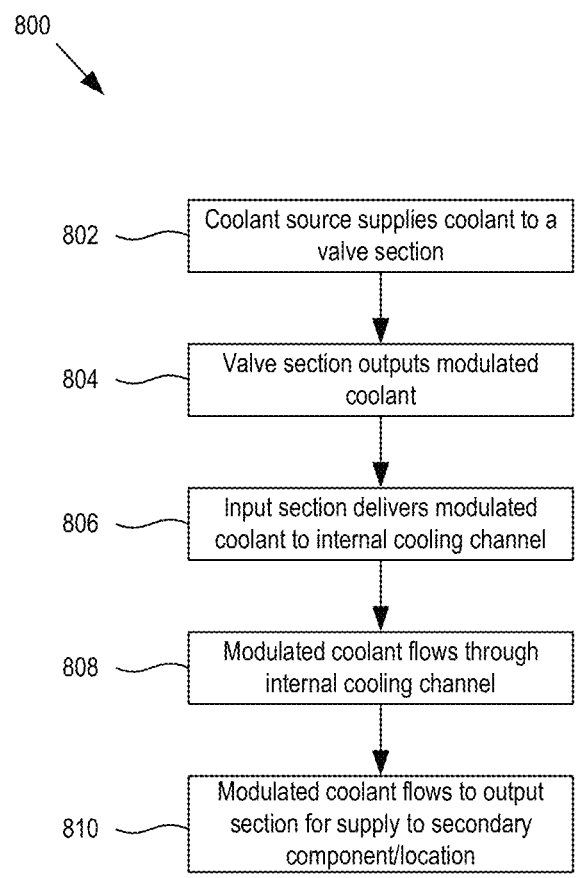
FIG. 8 is a flow chart of an example cooling method.

FIG. 8 shows a flow chart of an example blade track cooling method 800, in connection with the components described above with reference to FIGS. 1-7. The cooling method 800 may be performed during operation of an engine, such as the gas turbine engine 100. At block 802, the coolant source 702 may supply a coolant to the valve section 704. At block 804, the valve section 704 may output a modulated coolant based on the coolant received from the coolant source 702, and at a certain flow rate. In various embodiments, the valve section 704 may be configured in a certain state corresponding to certain flow rate. The controller 706 may determine the state corresponding to the certain flow rate, and set the valve section in the state so that it outputs the coolant at the certain flow rate. In various methods, the controller 706 may determine the state and/or the certain flow rate based on measurements taken by the at least one sensor 708, as previously described. Also, in various methods, at block 804, outputting the modulated coolant may include outputting the modulated coolant at different flow rates. For example, the controller 706 may determine to change the flow rate, output one or more control signals to the valve section 704 to effect the change, and in response, the valve section 704 may change the flow rate at which is outputting the modulated current.

At block 806, the input section 706 may receive the modulated coolant from the valve section 704, and deliver the modulated coolant to the internal cooling channel 218 of the blade track 202. At block 808, the modulated coolant may flow through the internal cooling channel 218 to the output section 712. During this time, the modulated coolant may cool, or otherwise regulate the temperature of, the blade track body 204. As described, the coolant flow path may be independent of other fluid flow paths within the engine 100 near the blade track 202, such as the main fluid flow path and/or the leakage flow path, as previously described. As such, the coolant supplied by the cooling system may be unaffected by the main fluid and/or the leakage fluid flowing near the blade track 202. At block 810, the modulated coolant may flow through the output section 712, which may supply the modulated coolant to a secondary component/location, as previously described.

To clarify the use of and to hereby provide notice to the public, the phrases "at least one of <A>, <B>, ... and <N>" or "at least one of <A>, <B>, <N>, or combinations thereof" or "<A>, <B>, ... and/or <N>" are defined by the Applicant in the broadest sense, superseding any other implied definitions hereinbefore or hereinafter unless expressly asserted by the Applicant to the contrary, to mean one or more elements selected from the group comprising A, B, ... and N. In other words, the phrases mean any combination of one or more of the elements A, B, ... or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A blade track system comprising: a blade track configured to be positioned around a plurality of blades of a gas turbine engine, the blade track comprising:

a full-hoop body comprising an outer surface and an inner surface, the inner surface defining an internal cooling channel extending within the full-hoop body;

an inlet port integrated with the full-hoop body and in fluid communication with the internal cooling channel, the inlet port configured to supply a coolant from external the hoop body to within the internal cooling channel; and an exit port integrated with the full-hoop body and in fluid communication with the internal cooling channel, the exit configured to discharge the coolant to outside the full-hoop body.

2. The blade track system of aspect 1, wherein the inlet port radially extends from the inner surface to a radially outward surface portion of the outer surface of the full-hoop body.

3. The blade track system of aspect 1 or 2, wherein the exit port radially extends from the inner surface to a radially outward surface portion of the outer surface of the full-hoop body.

4. The blade track system of aspects 1 or 2, wherein the exit port axially extends from the inner surface to a side surface portion of the outer surface of the full hoop body.

5. The blade track system of any of aspects 1 to 4, wherein the blade track further comprises a plurality of inlet ports comprising the inlet port.

6. The blade track system of aspect 5, wherein the plurality of inlet ports are circumferentially positioned equidistant from each other about the full-hoop body.

7. The blade track system of aspects 5 or 6, wherein the blade track further comprises a plurality of exit ports comprising the exit port.

8. The blade track system of aspect 7, wherein the plurality of exit ports are circumferentially positioned equidistant from each other about the full-hoop body.

9. The blade track system of aspect 7 or 8, wherein the plurality of inlet ports and the plurality of exit ports are alternatingly positioned about the full-hoop body.

10. The blade track system of any of aspects 7 to 9, wherein the plurality of inlet ports comprises exactly three inlet ports and the plurality of exit ports comprises exactly three exit ports.

11. The blade track system of any of aspects 1 to 10, wherein the internal cooling channel circumferentially extends entirely through the full-hoop body.

12. The blade track system of any of aspects 1 to 11, wherein the inner surface comprises at least one thickening portion circumferentially extending in the internal cooling channel.

13. The blade track system of any of aspects 1 to 12, further comprising an inlet tube coupled to a radially outward surface portion of an outer surface of the blade track, the inlet tube comprising an inner lumen in fluid communication with the inlet port.

14. The blade track system of aspect 13, wherein the inlet tube radially extends from the radially outward surface portion to an engine casing surrounding the blade track, the blade track and the engine casing defining a circumferential cavity therebetween.

15. The blade track system of aspect 14, further comprising: a forward seal plate providing a forward boundary of the circumferential cavity, and at least one side port axially extending through forward seal plate, the at least one side port configured to permit a leakage fluid to flow from external to within the circumferential cavity.

16. A system comprising:
    a blade track system comprising a blade track comprising:
        a full-hoop body surrounding a plurality of blades of a gas turbine engine; and
        an internal cooling channel extending within the full-hoop body, and
    a cooling system configured to supply a coolant over a coolant flow path to the internal cooling channel in the full-hoop body, the coolant flow path isolated from a main fluid flow path of the gas turbine engine extending through the plurality of blades.

17. The system of aspect 16, wherein the coolant comprises a modulated coolant, and wherein the cooling system further comprises a valve section configured to output the modulated coolant toward the internal cooling channel.

18. The system of aspect 17, wherein the valve section is configured to receive a low pressure air from a compressor section of the gas turbine engine.

19. The system of any of aspects 16 to 18, wherein the blade track system defines a leakage flow path extending in a circumferential cavity between the blade track and a casing, the coolant flow path further isolated from the leakage flow path.

20. A blade track cooling method comprising:
    flowing a main fluid over a main fluid flow path through a plurality of turbine blades surrounded by a blade track; and
    flowing a coolant over a coolant flow path through an internal cooling channel of the blade track, the coolant flow path isolated from the main fluid flow path.

What is claimed is:

1. A blade track system comprising:
    a blade track configured to be positioned around a plurality of blades of a gas turbine engine, the blade track comprising:
        a full-hoop body comprising an outer surface and an inner surface, the inner surface defining an internal cooling channel extending within the full-hoop body;
        an inlet port integrated with the full-hoop body and in fluid communication with the internal cooling channel, the inlet port configured to supply a coolant from external the hoop body to within the internal cooling channel; and
        an exit port integrated with the full-hoop body and in fluid communication with the internal cooling channel, the exit port configured to discharge the coolant to outside the full-hoop body.

2. The blade track system of claim 1, wherein the inlet port radially extends from the inner surface to a radially outward surface portion of the outer surface of the full-hoop body.

3. The blade track system of claim 1, wherein the exit port radially extends from the inner surface to a radially outward surface portion of the outer surface of the full-hoop body.

4. The blade track system of claim 1, wherein the exit port axially extends from the inner surface to a side surface portion of the outer surface of the full hoop body.

5. The blade track system of claim 1, wherein the blade track further comprises a plurality of inlet ports comprising the inlet port.

6. The blade track system of claim 5, wherein the plurality of inlet ports are circumferentially positioned equidistant from each other about the full-hoop body.

7. The blade track system of claim 5, wherein the blade track further comprises a plurality of exit ports comprising the exit port.

8. The blade track system of claim 7, wherein the plurality of exit ports are circumferentially positioned equidistant from each other about the full-hoop body.

9. The blade track system of claim 7, wherein the plurality of inlet ports and the plurality of exit ports are alternatingly positioned about the full-hoop body.

10. The blade track system of 7, wherein the plurality of inlet ports comprises exactly three inlet ports and the plurality of exit ports comprises exactly three exit ports.

11. The blade track system of claim 1, wherein the internal cooling channel circumferentially extends entirely through the full-hoop body.

12. The blade track system of claim 1, wherein the inner surface comprises at least one thickening portion circumferentially extending in the internal cooling channel.

13. The blade track system of claim 1, further comprising an inlet tube coupled to a radially outward surface portion of an outer surface of the blade track, the inlet tube comprising an inner lumen in fluid communication with the inlet port.

14. The blade track system of claim 13, wherein the inlet tube radially extends from the radially outward surface portion to an engine casing surrounding the blade track, the blade track and the engine casing defining a circumferential cavity therebetween.

15. The blade track system of claim 14, further comprising: a forward seal plate providing a forward boundary of the circumferential cavity, and at least one side port axially extending through the forward seal plate, the at least one side port configured to permit a leakage fluid to flow from external to within the circumferential cavity.

16. A system comprising:
    a blade track system comprising a blade track comprising:
        a full-hoop body surrounding a plurality of blades of a gas turbine engine; and
        an internal cooling channel extending within the full-hoop body, and
    a cooling system configured to supply a coolant over a coolant flow path to the internal cooling channel in the full-hoop body, the coolant flow path isolated from a main fluid flow path of the gas turbine engine extending through the plurality of blades.

17. The system of claim 16, wherein the coolant comprises a modulated coolant, and wherein the cooling system further comprises a valve section configured to output the modulated coolant toward the internal cooling channel.

18. The system of claim 17, wherein the valve section is configured to receive a low pressure air from a compressor section of the gas turbine engine.

19. The system of claim 16, wherein the blade track system defines a leakage flow path extending in a circumferential cavity between the blade track and a casing, the coolant flow path further isolated from the leakage flow path.

20. A blade track cooling method comprising:
flowing a main fluid over a main fluid flow path through a plurality of turbine blades surrounded by a blade track; and
flowing a coolant over a coolant flow path through an internal cooling channel of the blade track, the coolant flow path isolated from the main fluid flow path.

\* \* \* \* \*